United States Patent
Schwarz et al.

(10) Patent No.: US 8,967,646 B2
(45) Date of Patent: Mar. 3, 2015

(54) AXLE SUSPENSION AND AXLE LIFT FOR A VEHICLE AXLE

(75) Inventors: Michael Schwarz, Bergisch-Gladbach (DE); Arthur Neumann, Morsbach (DE); Swen Gmeiner, Marienheide (DE); Manfred Michels, Köln (DE); Bianca Luckau, Lohmar (DE)

(73) Assignee: BPW Bergische Achsen KG, Wiehl (DE)

( * ) Notice: Subject to any disclaimer, the term of this patent is extended or adjusted under 35 U.S.C. 154(b) by 0 days.

(21) Appl. No.: 14/006,328

(22) PCT Filed: Mar. 9, 2012

(86) PCT No.: PCT/DE2012/100059
§ 371 (c)(1),
(2), (4) Date: Nov. 14, 2013

(87) PCT Pub. No.: WO2012/126464
PCT Pub. Date: Sep. 27, 2012

(65) Prior Publication Data
US 2014/0138922 A1    May 22, 2014

(30) Foreign Application Priority Data
Mar. 21, 2011   (DE) .......................... 10 2011 001 431

(51) Int. Cl.
*B60G 7/00*     (2006.01)
*B60G 17/00*    (2006.01)
(Continued)

(52) U.S. Cl.
CPC ............... *B60G 17/00* (2013.01); *B60G 7/001* (2013.01); *B60G 9/003* (2013.01); *B60G 11/28* (2013.01);
(Continued)

(58) Field of Classification Search
CPC ............... B60G 9/003; B60G 2200/31; B60G 2202/412; B60G 2204/4302; B60G 11/28; B60G 17/00; B60G 2204/4702

USPC ........ 280/124.11, 124.116, 124.162, 124.153
See application file for complete search history.

(56) References Cited

U.S. PATENT DOCUMENTS

| | | | | |
|---|---|---|---|---|
| 4,773,670 A | * | 9/1988 | Raidel, II | 280/86.5 |
| 6,416,069 B1 | * | 7/2002 | Ramsey | 280/124.116 |
| 7,854,436 B2 | | 12/2010 | Hock et al. | |
| 8,459,666 B2 | * | 6/2013 | Piehl et al. | 280/86.5 |

FOREIGN PATENT DOCUMENTS

| | | |
|---|---|---|
| DE | 203 17 350 U1 | 3/2004 |
| DE | 10 2006 015 671 A1 | 10/2007 |
| DE | 10 2006 015 672 A1 | 10/2007 |
| DE | 10 2006 044 598 A1 | 3/2008 |

(Continued)

*Primary Examiner* — Ruth Ilan
*Assistant Examiner* — Timothy Wilhelm
(74) *Attorney, Agent, or Firm* — Gudrun E. Huckett

(57) ABSTRACT

An axle suspension for a vehicle axle guided by a trailing arm and also, furthermore, an axle lift for a vehicle axle are proposed. The axle lift includes a force element (11), a pressure transmission means (18, 20) which is movable towards an axle link (5) of the vehicle axle by actuation of the force element, and a bracket (12). The bracket (12) is provided with a supporting means (10) for the force element (11) and the pressure reaction forces acting on the latter and, in addition, for the fastening to a support (2) is provided with a bracket part (31), on which a plug-in or hook connection (36A) for engagement in the support (2) is formed. With the aim of being able to fit the bracket (12) in a fixed basic setting on the support (2) with just a few actions, it is proposed that the bracket part (31), at a distance from the plug-in or hook connection (36A) thereof, is provided with at least one further connecting means (33), which is designed for engagement in the support (2).

11 Claims, 3 Drawing Sheets

(51) Int. Cl.
*B60G 9/00* (2006.01)
*B60G 11/28* (2006.01)
*B62D 61/12* (2006.01)

(52) U.S. Cl.
CPC ........ *B62D 61/12* (2013.01); *B60G 2204/4302* (2013.01); *B60G 2202/412* (2013.01); *B60G 2204/4702* (2013.01)
USPC .............................. 280/124.116; 280/124.153

(56) References Cited

FOREIGN PATENT DOCUMENTS

| | | |
|---|---|---|
| DE | 10 2007 045 849 A1 | 4/2009 |
| EP | 0 941 915 A1 | 9/1999 |
| EP | 0 961 726 B1 | 12/1999 |
| EP | 1 661 739 A1 | 5/2006 |
| WO | 98/38074 A1 | 9/1998 |

* cited by examiner

AXLE SUSPENSION AND AXLE LIFT FOR A VEHICLE AXLE

BACKGROUND OF THE INVENTION

The invention relates to an axle suspension for a vehicle axle guided by a trailing arm, with a support which can be fixed on each vehicle side underneath a vehicle chassis, in which a trailing arm is fastened for rotary movement, which is supported by its other end via an air spring opposite the vehicle chassis, with a vehicle axle which crosses the trailing arm and fitted at its ends with the vehicle wheels, and with at least one axle lift with a force element, a pressure transmission means movable by actuating the force element against the trailing arm, as well as a console bracket which is provided with a supporting means for the force element and the pressure reaction forces acting on same, and which furthermore for fixing on the support is provided with a console bracket part on which a plug-in or hook connection is formed for engagement in the support. The invention also relates to an axle lift for a vehicle axle with a force element, a pressure transmission means which is movable by actuation of the force element against an axle link of the vehicle axle, as well as a console bracket which is provided with a supporting means for the force element and the pressure reaction forces acting on same, and which furthermore for fastening on a support which consists of two side walls and an end wall pointing in the drive direction and connecting the side walls together, is provided with a console bracket part on which a plug-in or hook connection is formed for engaging in the support.

In the axle suspension of an air-suspended vehicle axle according to EP 0 961 726 B1 a diaphragm cylinder operated by compressed air serves as the force element for raising the vehicle axle. This cylinder is supported on a console bracket which is mounted underneath the support of the vehicle axle. The support holds in its two side walls a bearing bolt which defines the pivotal axis for each relevant axle link of the vehicle axle. In order to divert the considerable forces used when lifting the axle to the support the console bracket engages by the arms formed thereon over the side walls of the support wherein the arms are supported inter alia against the bearing bolt. A part of the forces which occur during lifting of the vehicle axle is therefore transferred to this bolt and thus to parts of the axle suspension which are involved in the dynamic driving process.

From DE 699 17 105 T2 an axle suspension with an axle lift is known in which the force element which is designed here as an air spring is supported on a console bracket which is made up as a whole from three parts. A first console part on which the force element is directly supported is provided with a plug-in connection for engaging in the region of the end wall of the support. Constituent parts of the console brackets are furthermore suspension plates on either side of the support wherein the lower ends of the plates are each screwed to the first console bracket part and whose upper ends are suspended from the screw bolt. Also with this embodiment the axle lift is therefore supported inter alia on that bearing bolt which supports the axle link so that at least a part of the forces acting during lifting of the vehicle axle is also transferred to this bolt and thus to parts of the axle suspension which are involved in the dynamic driving process.

An axle suspension and axle lift without these drawbacks is known from DE 10 2006 044 598 A1. In order to obtain a console bracket which is adjustable over a wide region this bracket is designed in two parts wherein a first bracket part is a block-shaped pressure member which is screwed between two arms of the second console bracket part and is supported from below against the rod support. A second console bracket part is connectable via corresponding rows of holes in different positions to both the first bracket part and also the support. During assembly of the axle lift, in order to avoid faulty installation, it is necessary to use the correct pairs of holes, i.e. those which match the relevant chassis geometry. After horizontally inserting the first console bracket part the rows of holes of the second console bracket part have to be brought to overlap the two holes of the side walls of the support. It can thereby happen that the wrong hole is chosen for the connection, and the first console bracket part then no longer engages adequately with the end wall of the support. There is the danger that this connection subsequently becomes loose through the loads arising during driving operation. As a result the axle lift would pivot out of the way and lose its function since the lifting force no longer engages on the site provided for that purpose, and in the worst case scenario the second console bracket part could even shear off.

The axle lift according to DE 10 2006 044 598 A1 operates with a favorable diversion of the pressure reaction forces but up to the final fitting of the axle lift several assembly steps are required, inter alia for correctly adjusting and positioning the two console bracket parts.

The aim of the invention is therefore to be able to mount the console bracket of the axle lift with few manual steps in a basic setting on the support.

SUMMARY OF THE INVENTION

This is achieved through an axle suspension wherein the console bracket part can be attached in only one single position relative to the support. This is further achieved through an axle lift wherein the console bracket part is provided spaced from its plug-in or hook connection with at least one further connecting means which is formed for engaging in the support.

With few manual steps the console bracket can be fastened on the support in a basic position in which the axle lifting forces are safely transferred. The connection takes place in two regions at a distance from one another. The first connecting means is a plug-in or hook connection which is formed on the console bracket part. The other connecting means, at a distance from this, can consist for example of a rod mounted transversely in the console bracket part. This can be passed through openings located in the side walls of the support in order to fasten on the support.

When fixing the console bracket part first the plug-in or hook connection is brought into engagement with the support for which it is only necessary to move the console bracket part accordingly up to engagement. Further manual steps, thus for example screwing, fixing a securing ring etc. are not required in respect of this first connection.

A load-bearing mounting of the console bracket part is achieved in a clearly defined position which allows no other alternative. For mounting only a few manual steps are necessary which moreover take place only at one of these locations, whilst the connection at the other location is already reached by simply pushing in or hooking on the console bracket part.

Of advantage is the separation as regard forces of the axle lift from the chassis components which are involved in the dynamic driving process since the support of the console bracket housing the force element of the axle lift takes place solely on the base body of the support, and not on those parts of the axle suspension which are involved in the dynamic driving process. It is particularly avoided that a part of the considerable pressure reaction forces acting on the console bracket part is transferred to the bearing bolt which connects the axle link for pivotal movement to the support.

During the assembly in the basic position which is simple to execute, a further console bracket part on which the force element of the axle lift is supported can already be connected to the first console bracket part. As an alternative however it is also possible to fasten the further console bracket part only subsequently on the first console bracket part.

With goods vehicles for which the axle suspension is primarily used, different types of vehicles also require different driving heights. Driving height means to the technical expert the distance maintained by the valve of the air spring between the underside of the longitudinal beam of the vehicle, and the center point of the axle. In the schedule of an axle manufacturer the same axle link is combined with different height supports, air spring bellows as well as differently angled air spring console brackets. The pivotal range, thus the minimal and maximum outlet angle of the link from the support, also differs from chassis to chassis. Sometimes this range lies higher, sometimes it lies lower. As a result of these conditions and for the widest possible useful field the axle lift also has to be adaptable in its dimensions relevant for functioning.

In order to achieve this adaption through a corresponding arrangement of the force element, it is proposed in one configuration that the second console bracket part can be fastened on the first console bracket part in at least two different positions. For this, a one-piece shaped sheet metal part can be a constituent part of the first console bracket part and is comprised of two parallel side arms and a web section connecting these to one another on which the plug-in or hook connection is formed. With this type of construction the side arms of the first console bracket part are each provided with a number of openings for selectively passing through a screw connector with the second console bracket part. In this way the second console bracket part which holds the diaphragm cylinder can be fastened in at least two different positions on the first console bracket part in order to adapt to the relevant required geometry of the axle lift.

With a further development it is proposed that a one-piece shaped sheet metal part is a constituent part of the second console bracket part and is comprised of two parallel side arms and a cross wall connecting these together and on which the supporting means for the force element is located, and that the side arms are each provided with at least one opening for pushing through the screw connector to the first console bracket part.

For a favorable introduction of the lifting reaction forces acting on the console bracket onto the support it is further proposed that the upper side of the web section is provided with a supporting surface for bearing against the underside of the support.

With a further development it is proposed that the plug-in or hook connection is formed to engage horizontally into the support wherein the further connection means has horizontally no play or at maximum a play which is lower than this horizontal engagement.

The adjustment of the axle lift to the relevant chassis geometry can be undertaken alternatively or additionally also on the axle link where during operation of the force element its lifting force impacts on the axle link in order to lift this. With further developments of the invention measures are therefore proposed to allow a force absorbing member mounted on the axle link for the lifting force to be fitted simply in more than just one position.

BRIEF DESCRIPTION OF THE DRAWINGS

Further details and advantages of the invention are apparent from the following description of embodiments with reference to the associated drawings. They show.

DESCRIPTION OF PREFERRED EMBODIMENTS

Figure 1:
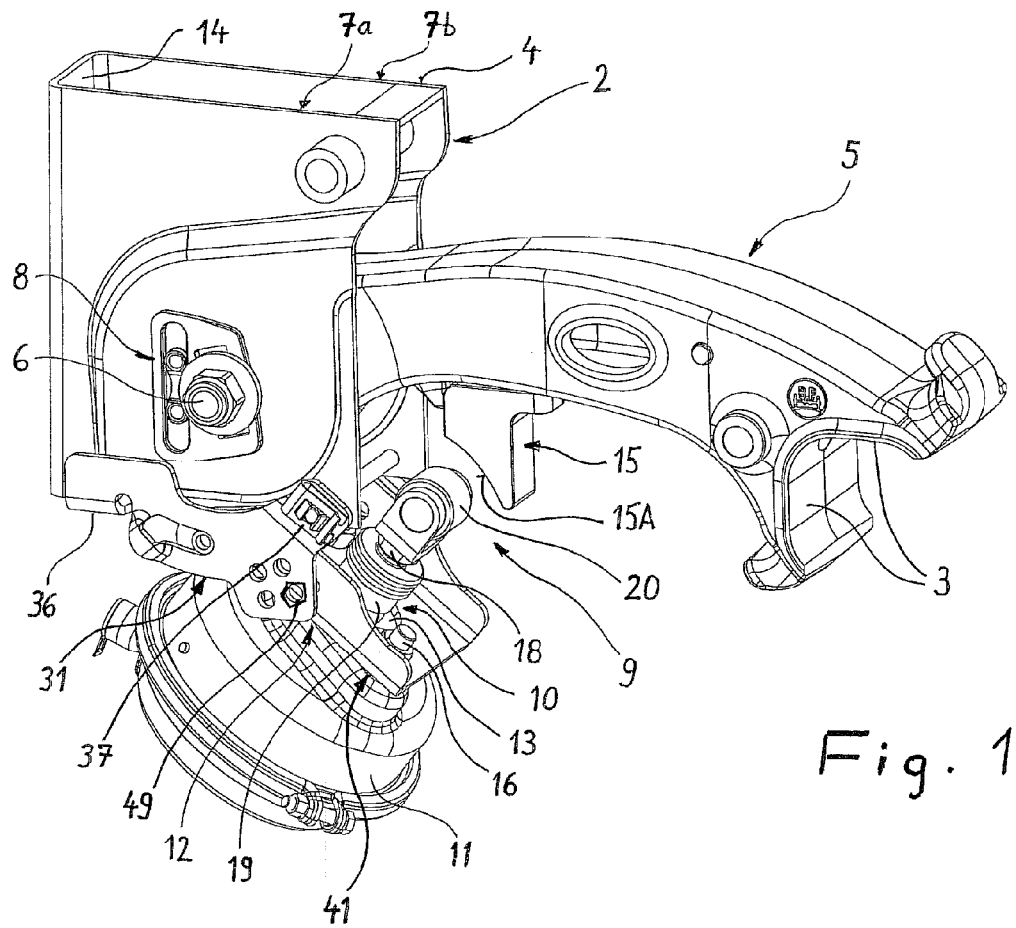
FIG. 1 in a perspective mainly lateral view, parts of an air-sprung axle suspension including a support, as well as an axle link pivotally mounted therein, but without illustrating the axle itself.

FIG. 1 shows the axle suspension of a goods vehicle trailer or semi-trailer. Supports 2 are fastened on the left and right underneath the vehicle frame, preferably by welding the upper edge 4 of the support to the underside of the longitudinal beam of the vehicle frame. An axle link or trailing arm 5 for the vehicle axle is mounted for pivotal movement in each support 2, each pivotal about a bolt 6.

Each axle link or trailing arm 5 is formed as a cast part of cast steel or light metal. The front end of each axle link 5 is formed as an eye in which a rubber bush or a rubber-steel bush is seated. The bolt 6 extends through this bush as well as through the side walls 7a, 7b of the support 2. Air spring bellows of an air suspension formed in the conventional way are each fastened at the rear end of the axle links 5 (not shown in the drawing). Such air spring bellows are generally supported from underneath against the vehicle frame.

Each axle link 5 is connected in an axle socket 3 to the axle body of the vehicle axle. The axle body, preferably an axle rod, is designed to pass from the left to the right side of the vehicle and supports at its two ends the wheel bearings of the vehicle wheels.

To adjust the track and forward running of the vehicle axle the supports 2 are provided with adjusting devices 8.

The base body of the support 2 is designed with a U-shaped cross-section and is comprised of the two side walls 7a, 7b which are substantially parallel to one another, and of an end wall 14 which points forwards in the driving direction. The base body of the support 2 is open to the back and downward. It can be designed in one piece in an advantageous technical manufacturing process wherein all its walls, thus the two side walls 7a, 7b and the front end wall 14, are sections of one and the same sheet metal strip. This sheet metal strip of for example steel plate is shaped in a cold shaping process, e.g. in a stamping or stamping-bending process into the shaped sheet metal part which is shown in the drawing. A support made from cast material is also conceivable.

The side walls 7a, 7b are provided with holes. The bolt 6 passes through these holes as well as through the front eye of the axle link 5 and thus forms the pivotal axis of the axle link.

In order to lift the air-sprung vehicle axle shown in FIG. 1 in the driving position into its raised position if this axle is not required for the driving operation, an axle lift is provided with a lifting device 9 which is mounted underneath the support 2. A constituent part of the lifting device 9 is a diaphragm cylinder 11 which is operated by compressed air and which is mounted rigidly on the support 2 by means of a console bracket 12 whose individual parts will be explained in further detail below. The console bracket 12 is provided with a supporting means 10 for fastening the diaphragm cylinder 11. Constituent parts of the supporting means 10 are screws 16 which are mounted on either side of an opening 13 on the console bracket and which fasten the diaphragm cylinder rigidly to the console bracket 12.

The axle link 5 of the axle suspension is provided on its underside with a force absorbing member 15 on which a rolling surface 15A is formed to take up the lifting force. The force absorbing member 15 is designed here in block fashion. It is hung by a hook from below in an opening of the axle link, and is secured at the same time by a screw.

The diaphragm cylinder 11 is the force element of the axle lift. Its housing is supported rigidly on the console bracket 12 by means of the screw connectors 16. A part of the diaphragm cylinder 11 hereby projects upwardly inclined through an opening 13 in the console bracket. In this region there is an axial guide 19 for a piston rod 18 which passes out from the diaphragm cylinder 11 and is driven by the compressed medium in the diaphragm cylinder. The axial guide 19 can be a plastics bush which guides the piston rod 18 axially over a certain part of its length. At its end the piston rod 18 is provided with a roller 20 mounted on an anti-friction bearing.

During actuation of the force element 11 by means of compressed air, through the unit of piston rod 18 and roller 20 which together form a force transmission unit, an upwardly inclined pressurised force is directed against the opposing force absorbing member 15 on the axle link 5. The axle link 5 is thereby pivoted upwards about the bolt 6, and the axle is raised.

Away from the axle lift operation, the force transmission unit 18, 20 composed of the piston rod and roller, is drawn back towards the diaphragm cylinder 11 whereby the roller 20 has no more contact with the force absorbing member 15 and the axle link 5 can move freely according to the driving conditions.

The rolling surface 15A on the force absorbing member 15, here formed as a block, is designed as an involute curved concave relative to the roller 20. The path of the involute is such that the surface normal of that site at which the roller 20 bears against the rolling surface 15A coincides precisely with the longitudinal axis of the piston rod 18. Through this alignment and geometric configuration of the component parts involved the result is that no or in any case very slight transverse forces are exerted on the roller 20 and thus on the piston rod 18. Equally it can be advisable to guide the piston rod 18 axially for which the axial guide 19 is fastened on the housing of the diaphragm cylinder close to the exit of the piston 18 out from the housing of the diaphragm cylinder 11.

The console bracket 12 of the axle lift is designed in two parts. It consists essentially of a first console bracket part 31 and a second console bracket part 41. The first console bracket part 31 is fastened directly on the support 2 in a non-changeable position, and transfers the reaction forces which are connected with lifting to this support. On the other hand the second console bracket part on which the supporting means 10 of the diaphragm cylinder 11 and thus of the force element of the axle lift are located, is fastened on the first console bracket part 31, and thus only indirectly on the support.

Figure 3:
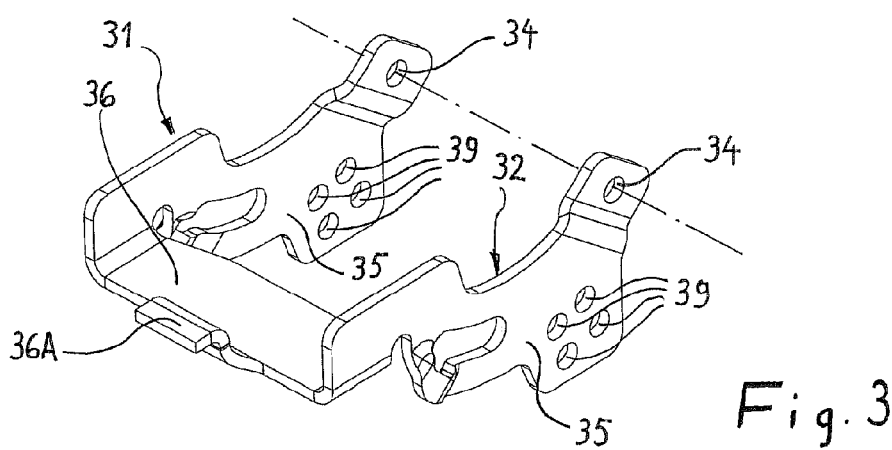
FIG. 3 a perspective view of the first console bracket part.

The construction and fastening of the console bracket parts will be explained in further detail below with reference to FIGS. 2a, 2b and 3.

Figure 2A:
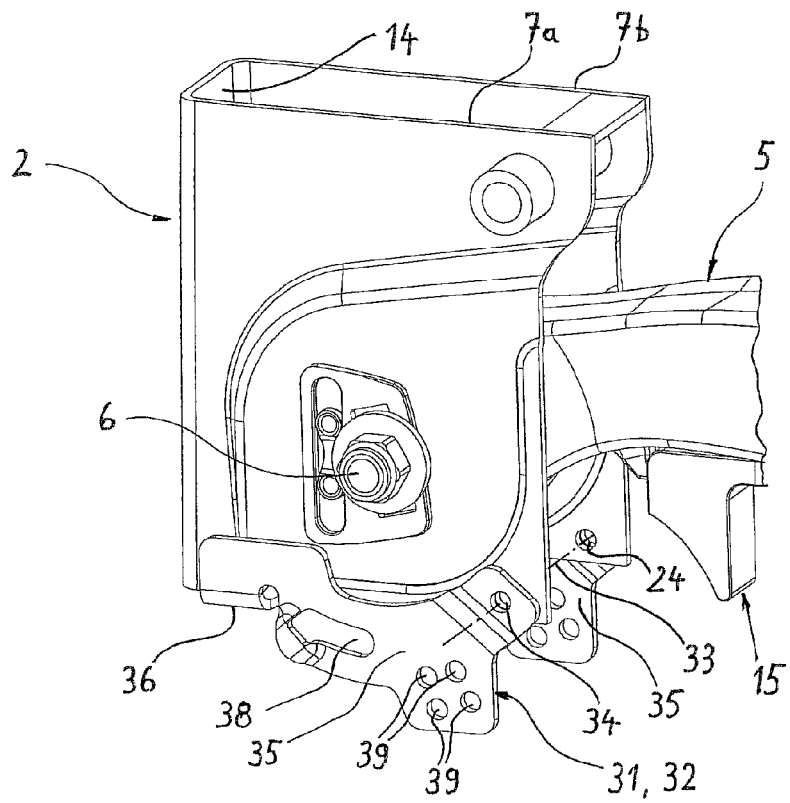
FIG. 2a the area of the support and the axle lift fastened thereon including a first console bracket part of the axle lift mounted underneath.

The first console bracket part 31 consists essentially of a shaped sheet metal part 32 and an axially secured rod 33 which is only indicated along its center line in FIG. 2a. The console bracket part 31 is connected to the support 2 at two sites located horizontally at a distance from one another. As a front connection in the driving direction, a plug-in connection or hook connection 36A serves for engaging in the end wall 14 of the support. The connection 36A is thus shaped so that it engages through simple keyed connection in a correspondingly shaped structure in the support 2, namely here in an opening in the lower region of the end wall 14 of the support.

The shaped sheet metal part 32 of the console bracket part 31 is comprised of two legs 35 which in the assembled state are mounted outside on the side walls 7a, 7b of the support, and of a web section 36 which connects these two. The plug-in or hook connection 36A which engages horizontally in the opening in the support 2 is located on the web section 36.

The web section 36 extends transversely through beneath the support 2 wherein its upper side serves as the support face which is supported from below against the support 2, and thus diverts the major part of the pressure reaction forces which occur during lifting of the axle, in a direct route into the support 2. As an alternative the pressure reaction forces can also be introduced into the support 2 exclusively or predominantly via the plug-in and hook connection 36A and/or via the other connection at a distance therefrom.

At the rear end of the shaped sheet metal part 32 its legs 35 are each provided with a bore 34 which aligns flush with the bore 34 in each other legs 35. The bores 34 are arranged so that when the console bracket part 31 is fitted they align flush with the bores 24 in the side walls 7a, 7b of the support 2. The rod 33 which is a constituent part of the console bracket part 31 is passed through these in total four bores 24, 34 and is axially secured. For axial securing, the rod 33 is provided at its one end with an enlarged head, and at its other end with a ring groove on which a securing clip 37 (FIG. 1) can be fitted.

Fastening the first console bracket part 31 on the support 2 is carried out by moving the console bracket part forwards until the plug-in and hook connection 36A formed at the front passes into the opening in the end wall 14 of the support 2. Then possibly by slightly lifting the sheet metal shaped part 32 whose bores 34 are brought to overlap with the bores 24 of the support, the rod 33 is passed through and secured axially by means of the securing clip 37. The front connecting means in the form of the plug-in or hook connection can then no longer be loosened since the rear connecting means spaced horizontally from the front connecting means and in the form of the rod 33 prevent this. For this purpose the correspondingly small tolerance of the rod 33 and bores 24, 34 are required. The horizontal play which is possible there is less than the horizontal engagement of the plug-in or hook connection 36A at the front on the console bracket part 31.

Alternatively the plug-in and hook connection can also take place in the side walls 7a, 7b of the support 2. It is likewise conceivable that the other connection, arranged at a distance, serves only to secure several plug-in or hook connections, and undertakes no function supporting the console bracket.

Figure 2B:
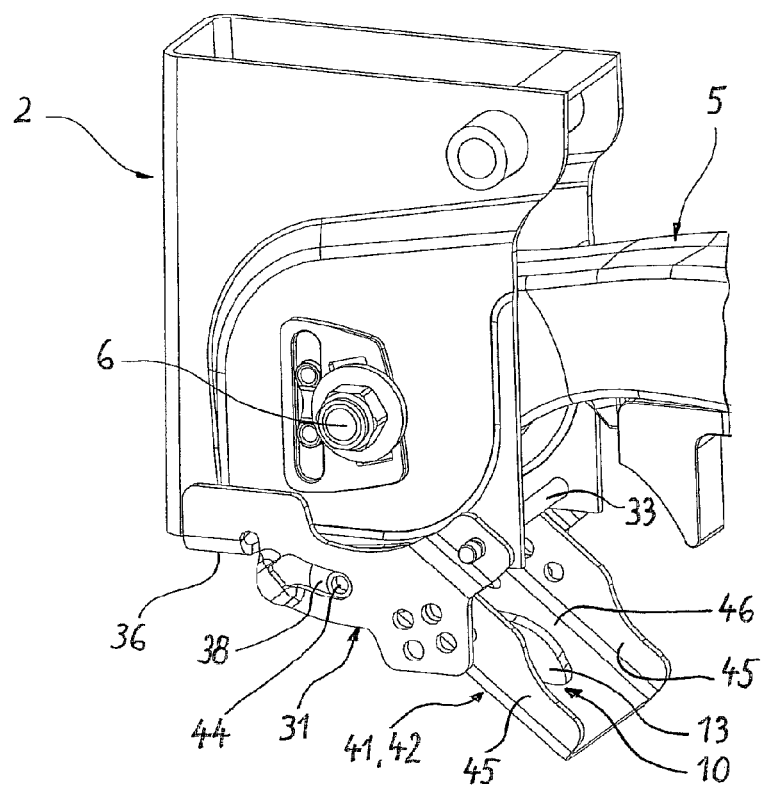
FIG. 2b the objects according to FIG. 2a with a second console bracket part additionally fastened thereon.

According to FIG. 2b, the other console bracket part 41 also consists substantially of a one-piece shaped sheet metal part 42 which is comprised of two side arms 45 parallel to one another, and a cross wall 36 connecting these together, wherein the diaphragm cylinder 11 is supported on this cross wall 46 by means of the screw connections 16.

In order to adjust the second console bracket part 41 in relation to the first console bracket part 31 the legs 35 are each provided with a pattern of holes. Screws 49 can be selectively pushed through these holes 39 (FIG. 1) in order thus to be able to fasten the second console bracket part on the first console bracket part in one of several optional available positions and to adapt the path of movement of the axle lift to the relevant chassis geometry.

Constituent parts of the second console bracket part 41 are through-guides 44 serving as studs on both side arms 45 which always engage in an oblong hole 38 in the relevant legs 35 of the first console bracket part 31. The oblong holes 38 are not straight but follow an arc whose reference center point coincides approximately with the bolt 6.

Adjusting the axle lift can be carried out subsequently and individually by the vehicle manufacturer after the first console bracket part 31 has been first mounted on the support 2 in its non-variable basic position. Alternatively the possibility exists of connecting the two console brackets parts 31, 41 in a specific relative position which is suitable for the relevant type of chassis prior to attaching the axle lift on the support. The thus prepared console bracket comprising the two console bracket parts 31, 41 is then fastened as a unit underneath the support 2 without the risk of an accidental faulty fitting.

Figure 4:
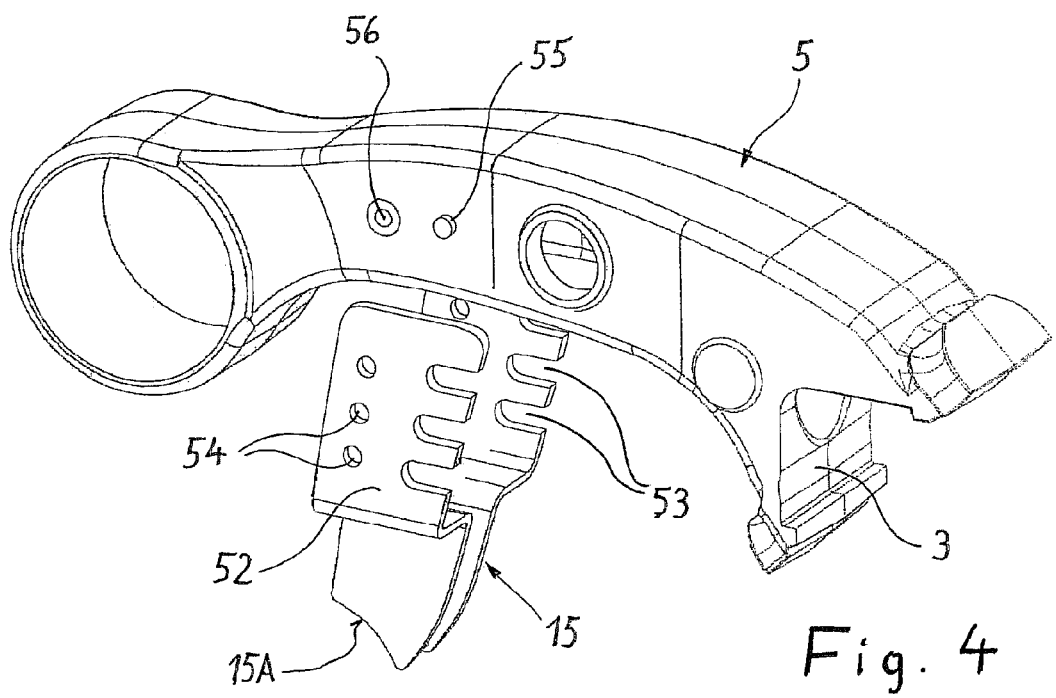
FIG. 4 a second embodiment of an axle link with a force absorbing member which can be fastened thereon in different positions.
Figure 5:
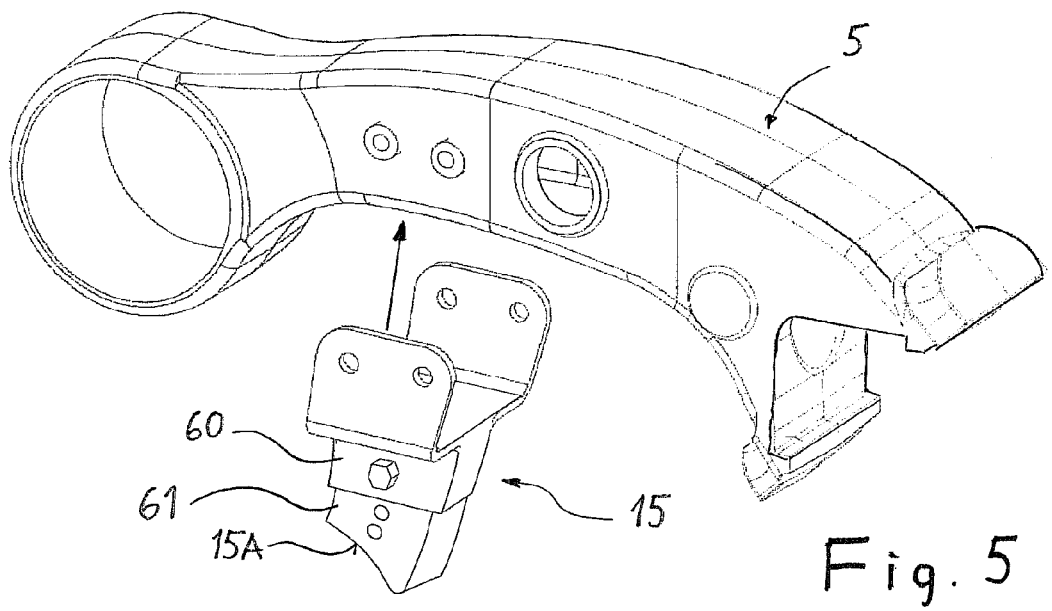
FIG. 5 a further embodiment of an axle link with a force absorbing member which can be fastened thereon in different positions.

Adapting the axle lift and more particularly its movement path to the relevant chassis geometry can however also take place on the sides of the axle link, which is shown in two different embodiments in FIGS. 4 and 5.

According to FIG. 4 the force absorbing member 15 mounted underneath the axle link 5 is provided with one arm 52 each on either side of the axle link 5. This comprises structures which permit fitting at different heights, here three different heights. The structures consist in slits 53 open on one side as well as bores 54 in the arms 52. These are selectively connectable with a corresponding stud 55 or a bore 56 of the axle link 5 in order thus to adjust the position of the rolling face 15A which is formed on the force absorbing member 15 so that during operation of the axle lift an alignment with the force transmission unit consisting of the piston rod 18 and roller 20 is set. The force absorbing member 15 is thus always arranged in an extension of the active direction of the force element 11.

With the embodiment according to FIG. 5, the force absorbing member 15 is designed in two parts comprising a base element 60 which can be screwed to the axle link 5 only in one position, and a block 61 which is adjustable in several positions relative to the base element 60 and on which the rolling face 15A is formed.

LIST OF REFERENCE NUMERALS

2 Support
3 Axle socket
4 Edge
5 Axle link (trailing arm)
6 Bolt
7a Side wall
7b Side wall
8 Adjusting device
9 Lifting device
10 Supporting means
11 Force element, diaphragm cylinder
12 Console bracket
13 Opening
14 End wall
15 Force absorbing means
15A Rolling surface
16 Screw
18 Piston rod
19 Axial guide for piston rod
20 Roller
24 Bore
31 First console bracket part
32 Shaped sheet metal part
33 Rod
34 Bore
35 Leg
36 Web section
36A Plug-in or hook connection
37 Securing clip
38 Oblong hole
39 Hole pattern
41 Second console bracket part
42 Shaped sheet metal part
44 Through-guides
45 Side arm
46 Cross wall
49 Screw
52 Arm
53 Slit
54 Bore
55 Stud
56 Bore
60 Base element
61 Block

What is claimed is:

1. An axle suspension for a vehicle axle, the axle suspension comprising:
a support adapted to be fixed on a vehicle side underneath a vehicle chassis and comprising opposed side walls and further comprising an end wall connecting the opposed side walls, wherein the side walls each are provided with a hole and a bore spaced apart from the hole;
a trailing arm associated with the support, wherein the trailing arm has a first end and a second end, wherein the first end is provided with an eye and is rotatably connected to the support by a bolt extending through the eye, the eye arranged between the opposed sidewalls, and extending through the holes in the opposed side walls, and wherein the second end is air-sprung relative to the vehicle chassis;
the trailing arm having an axle socket in which a vehicle axle is received;
an axle lift arranged on the support, the axle lift comprising a force element and a pressure transmission means, wherein the force element is operatively connected to the pressure transmission means so as to move the pressure transmission means against the trailing arm when the force element is actuated;
the axle lift comprising a console bracket comprising a supporting means, wherein the supporting means supports the force element and supports pressure reaction forces acting on the force element;
the consol bracket further comprising a console bracket part having a plug-in or hook connection, wherein the console bracket part is attached to the support and the plug-in or hook connection engages by a keyed connection an opening provided at a lower region of the end wall of the support;
the console bracket part comprising a shaped sheet metal part comprising two legs, wherein the two legs each comprise a rear end provided with a bore, wherein the bores of the rear ends are aligned with each other and arranged such that, when the console bracket part is mounted, the bores of the rear ends are aligned with the bores of the opposed side walls of the support so that the console bracket part is adapted to be attached in only one single position on the support.

2. An axle lift for a vehicle axle, the axle lift comprising:
a force element;
a pressure transmission means, wherein the force element is operatively connected to the pressure transmission means so as to move the pressure transmission means against a trailing arm of a vehicle axle when the force element is actuated;

a console bracket comprising a supporting means, wherein the supporting means supports the force element and supports pressure reaction forces acting on the force element;

the consol bracket further comprising a first console bracket part having a plug-in or hook connection, wherein the first console bracket part is adapted to be attached to a support, the support adapted to be mounted underneath a vehicle chassis and comprised of two side walls and an end wall connected to the two side walls and pointing in a drive direction of a vehicle, wherein the plug-in or hook connection engages the support when the axle lift is attached to the support;

the first console bracket part having, spaced from the plug-in or hook connection, at least one further connecting means that is adapted to engage the support;

wherein the console bracket further comprises a second console bracket part and the second console bracket part is fastened on the first console bracket part, wherein the force element is supported on the second console bracket part;

wherein the second console bracket part is adapted to be fastened on the first console bracket part in at least two different positions.

3. The axle lift as claimed in claim 2, wherein the first console bracket part comprises a one-piece shaped sheet metal part comprised of two parallel legs and one web section connecting the two parallel legs to each other, wherein the plug-in or hook connection is formed on the web section, wherein the two parallel legs are each provided with several openings for selectively pushing through a screw connection that connects the first and second console bracket parts to each other.

4. The axle lift as claimed in claim 3, wherein the second console bracket part comprises a one-piece shaped sheet metal part comprised of two parallel side arms and a cross wall connecting the two parallel side arms to each other, wherein the supporting means for the force element is arranged on the cross wall, wherein the two parallel side arms each are provided with at least one opening for selectively pushing through a screw connection that connects the first and second console bracket parts to each other.

5. The axle lift as claimed in claim 3, wherein an upper side of the web section is provided with a support face for bearing against an underside of the support.

6. The axle lift as claimed in claim 3, wherein the first console bracket part is locked by the at least one further connecting means at least vertically relative to the support.

7. The axle lift as claimed in claim 6, wherein the at least one further connecting means is a rod mounted transversely in the first console bracket part and passing through bores in the two side walls of the support.

8. The axle lift as claimed in claim 7, wherein the plug-in or hook connection is designed for horizontal engagement and wherein the at least one further connecting means has horizontally no play or at most play that is less than the horizontal engagement.

9. The axle lift as claimed in claim 2, comprising a force absorbing member adapted to be fastened on the trailing arm so as to be positioned in alignment with an active direction of the force element.

10. The axle lift as claimed in claim 9, comprising connecting means formed on the force absorbing member, wherein the connecting means are designed to provide at least two different positions for attaching the force absorbing member on the trailing arm.

11. The axle lift as claimed in claim 2, wherein the at least one further connecting means engages bores provided in the sidewalls of the support.

* * * * *